US008787876B1

United States Patent
Cazanas et al.

(10) Patent No.: US 8,787,876 B1
(45) Date of Patent: Jul. 22, 2014

(54) PARENTAL CONTROL OF MOBILE MESSAGE CONTENT

(75) Inventors: Carlos A. Cazanas, Bethlehem, PA (US); Azam Khan, Franklin Park, NJ (US); Brian Tims, Bethlehem, PA (US)

(73) Assignee: Cellco Partnership, Basking Ridge, NJ (US)

( * ) Notice: Subject to any disclaimer, the term of this patent is extended or adjusted under 35 U.S.C. 154(b) by 883 days.

(21) Appl. No.: 12/946,505

(22) Filed: Nov. 15, 2010

(51) Int. Cl.
*H04M 1/66* (2006.01)
*H04M 3/42* (2006.01)

(52) U.S. Cl.
USPC .......................................... 455/411; 455/417

(58) Field of Classification Search
USPC ........... 455/411, 418–420, 466, 412.1–412.2, 455/414.1–414.3, 417
See application file for complete search history.

(56) References Cited

U.S. PATENT DOCUMENTS

| | | | |
|---|---|---|---|
| 5,751,707 A | 5/1998 | Voit et al. | |
| 5,754,546 A | 5/1998 | Voit et al. | |
| 7,302,272 B2 * | 11/2007 | Ackley | 455/466 |
| 2002/0168978 A1 * | 11/2002 | Molnar et al. | 455/433 |
| 2005/0048998 A1 * | 3/2005 | Zhu | 455/550.1 |
| 2007/0264978 A1 * | 11/2007 | Stoops | 455/414.1 |
| 2008/0246605 A1 * | 10/2008 | Pfeffer et al. | 340/540 |
| 2009/0170492 A1 * | 7/2009 | Lee | 455/418 |
| 2011/0065419 A1 * | 3/2011 | Book et al. | 455/411 |
| 2011/0105091 A1 * | 5/2011 | Jones | 455/414.1 |
| 2011/0237221 A1 * | 9/2011 | Prakash et al. | 455/411 |

* cited by examiner

*Primary Examiner* — Brandon Miller

(57) ABSTRACT

An adult associated with a mobile station of a minor is allowed to monitor and control the multimedia content, such as multimedia messaging service (MMS) message content, that is accessible via the minor's mobile station. A mobile station of the minor may be identified as such in the network information associated with that station's mobile number. The information for the minor's mobile station also identifies a mobile station of an associated adult. An MMS message addressed for delivery to the mobile station of the minor is first sent to the mobile station of the associated adult. This enables the adult to determine if the content of the MMS message is approved for delivery to the minor. If the adult approves the MMS content, the MMS message is forwarded to the minor's mobile station, but the MMS message is not forwarded to the minor if the adult disapproves of the content.

20 Claims, 7 Drawing Sheets

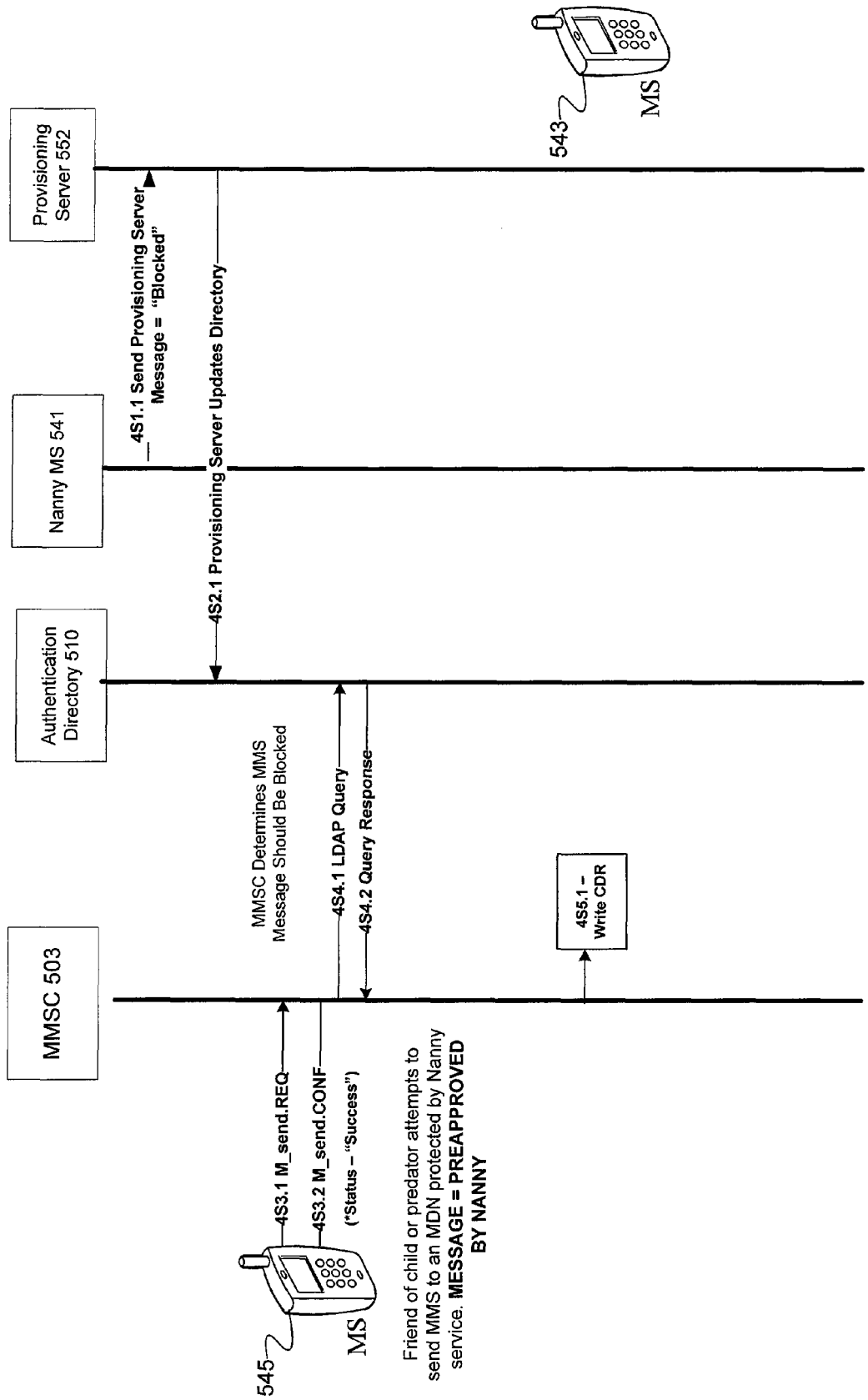

PARENTAL CONTROL OF MOBILE MESSAGE CONTENT

TECHNICAL FIELD

The present subject matter relates to techniques and equipment to allow an adult, such as a parent, to screen mobile multimedia messaging service message content, for a mobile station of a minor, thereby allowing the adult to determine whether or not to permit delivery of the content to the minor's mobile station.

BACKGROUND

In recent years, cellular and/or personal communication service type mobile devices have emerged as a must-have appliance among mobile professionals and consumers alike, growing in popularity every year since they were first introduced. The public has come to accept that mobile communication service enhances business and personal communications and may contribute to personal security. Consequently, mobile communication is becoming increasingly popular.

Manufacturers have developed wireless devices, such as cellular telephones, with increasing processing power, fast approaching the computing capabilities of devices such as personal computers and personal digital assistants ("PDAs"). Because of this increased processing power, mobile stations actually can be programmed to perform a wide range of application functions, for example, related to tools for productivity enhancement, gaming, entertainment, and the like.

Although originally designed and deployed to offer voice-grade telephone services, as the technologies have developed, the mobile stations and the networks that provide service through them have offered an expanding array of data communication services and other related services. For example a Short Message Service (SMS) application allows users of mobile devices to send and receive text messages; and more recently a MMS application allows users of mobile devices to send and receive multimedia content, such as text, graphics, digital photographs, audio files and video clips, via non-real-time transmission.

SMS is a communication protocol that allows the interchange of short text messages between mobile devices. The SMS technology has facilitates the development and growth of text messaging. SMS as used on modern mobile devices was originally defined as sending messages of up to 160 characters, to and from GSM mobile devices. Since then, support for the service has expanded to include alternative mobile standards such as American National Standards Institute (ANSI) Code Division Multiple Access (CDMA) networks and Digital Advanced Mobile Phone System (AMPS), as well as satellite and landline networks. Most SMS messages are mobile-to-mobile text messages, though the standard supports other types of messaging as well.

MMS is a store and forward messaging service/standard that allows mobile devices to send/receive messages that may include any combination of multimedia objects (images, audio, video, rich text, etc.). MMS is the evolution of SMS, which is a text-only messaging technology for mobile networks. MMS has been designed to at least work with mobile packet data services such as General Packet Radio Service (GPRS) and 1x/Evolution Data Only (EVDO).

MMS-enabled mobile devices enable subscribers to compose and send messages with one or more multimedia parts. Multimedia parts may include text, images, audio, and video. Furthermore, MMS allows the sending of multiple media parts in a single message, as well as the ability to send a single message to multiple recipients.

An example of how a MMS message can be sent and received between two compatible MMS mobile devices is detailed below. However, it is understood that the network operator may vary the sequence described below.

Using a MMS compatible mobile device, the originating subscriber may create a MMS message, either using a built-in or accessory camera or using images and sounds stored previously in the mobile device (and/or possibly downloaded from a web site or sent in an email). The mobile subscriber may personalize the message by adding text, a sound clip, voice to the image or any combination of the aforementioned applications. The MMS message is subsequently sent to a Multimedia Message Service Center (MMSC) for delivery to another mobile subscriber. If the recipient of the MMS message has a MMS compatible mobile device, then a MMS message notification will appear on the recipient's mobile device alerting the recipient of a new message. Even if the recipient mobile device is not switched on, the MMS message will be stored within the operator's network and subsequently sent to the recipient as soon as they switch on their mobile device. In a non-roaming case, the subscriber may even allow a MMS message to be downloaded automatically to their mobile device and then he would be notified and could see the MMS message immediately. Furthermore, a number of MMS messages can be stored in the subscriber's mobile device and reviewed or forwarded at a later date. When the MMS message is retrieved from the operator's network, the picture message will open on the screen, text may appear below the image and the audio may begin to play automatically. However, if the MMS message is sent to a non-compatible MMS mobile device, then the user will receive a SMS message possibly stating: "You have been sent a picture message!" The recipient may then be given a website address, and possibly a username/password on which they can view the MMS message using a computer or the like.

As demonstrated above, traditional MMS allows subscribers unlimited Person-to-Person (P2P) messaging flexibility that did not exist in conventional SMS deployment. Although P2P communications are the most common use today, MMS messaging may also be used to obtain content from a server of a third party content provider, such as a value added service provider (VSAP).

The added flexibility offered by MMS has brought with it added risk, particularly to minors. Prior to MMS messaging, minors were exposed to various types of multimedia content through television and/or computer applications. Through computer and television related applications, minors often are able to gain access to content that is deemed inappropriate or dangerous. Existing tools allow adults to work in connection with internet providers and television service providers to block or limit access of such content by minors.

In order to control a minor's access, the television industry screens programming and provides an age-based rating and content descriptors that indicate to the adult that the programming may be inappropriate for viewing by minors. Similarly, internet service providers may identify certain websites which likely contain content that is inappropriate for minors. Based on this information, parents may screen or block inappropriate content and thereby prevent access by the minor using various tools including the V-chip technology and filtering software. In such systems, the providers are primarily responsible for identifying the potentially harmful content.

Doing so requires identification and classification of websites, television programs, or the like for use by the adult. Internet content and television programming are publicly available and accessible to service providers. Because the content is likely to reach a large number of customers, identifying inappropriate content is not overly burdensome.

Unlike internet and television applications, traditional MMS messages are private and sent from individual to individual instead of to the public as a whole. As such, content review by service providers would require review of private information. Further, the MMS content to be monitored grows exponentially and cannot be effectively monitored by the service provider alone. Still further, traditional MMS allows minors to receive multimedia content on a device that is traditionally not accessed by any adults associated with the minor. MMS messaging thus becomes an ideal mode of access and communication with minors for inappropriate content and even for predators and others who wish to contact the minor without supervision of an adult.

Hence, a need to monitor the multimedia content received by a minor via MMS messaging on his mobile device exists. Further, a need for a means by which a parent or guardian may monitor, control, and block multimedia content intended for a minor also exists.

For example, it would be desirable to provide adults a way to control access to multimedia content viewed by minors. It may be further desirable to prevent inappropriate or harmful multimedia content from reaching minors. Additionally, it is desirable to allow adults to monitor multimedia content viewed or listened to by a minor and to determine and control the source of such information.

SUMMARY

The teachings herein alleviate one or more of the above noted problems with monitoring a minor's access to multimedia content via minor's mobile station and thus provide one or more of the above-noted desirable advantages relating to adult supervision/control of multimedia content delivered to the minor's mobile station.

A communication system is disclosed herein, which incorporates concepts to allow an adult associated with a mobile station of a minor to monitor and control the minor's multimedia content obtained or viewed via the mobile communication device.

For example, a mobile station of a minor may be identified as such in the information associated with the mobile number of the mobile station of the minor. The information associated with the mobile device may also identify a terminal device, such as a mobile station, of an adult associated with the mobile station of the minor. Upon determining that a MMS message is addressed for delivery through the wireless mobile communication network to the mobile station of the minor, the MMS message is sent to the terminal device of the adult associated with the minor. This enables the adult to determine if the content of the MMS message is approved for delivery to the mobile station of the minor. If adult approves the MMS content, the MMS message is forwarded to the mobile station of the minor for his review. If the content is disapproved by the adult, the MMS message is not forwarded to the mobile station of the minor.

In addition to allowing the adult associated with the mobile station of the minor to review the content of each MMS message addressed for delivery to the mobile station of the minor, the adult may also preauthorize or block content addressed for delivery to the mobile station of the minor. This preauthorization or blocking of content may occur in response to a MMS message addressed for the mobile station of the minor reviewed by the adult or may be based on any other criteria deemed useful by the adult.

The methods for monitoring and controlling MMS content delivery addressed to the mobile station of a minor, as outlined above, may be implemented as various combinations of hardware and software for implementing the information flow control.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a signal flow diagram for MMS communication, where a sender of a MMS message is blocked from sending MMS messages to a mobile station of a minor.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and devices disclosed in the examples below provide a method for routing a MMS message through a wireless network for review by an adult prior to being sent to the mobile station of a minor. The examples will assume that the MMS message intended for the minor originates from another mobile station which is operable within the network.

However, those skilled in the art will appreciate that the techniques described below may also apply to MMS message originating on other types of devices, e.g. as might carry content from various servers or service providers.

Reference now is made in detail to the examples illustrated in the accompanying drawings and discussed below. In today's networks, a Mobile Station (MS) can be a cellular phone, personal digital assistant, personal computer or any other wireless communication device adapted to communicate with a wireless carrier network. Typically, a user will carry a mobile station as he or she travels to work, to home, and to other locations.

Figure 5A:
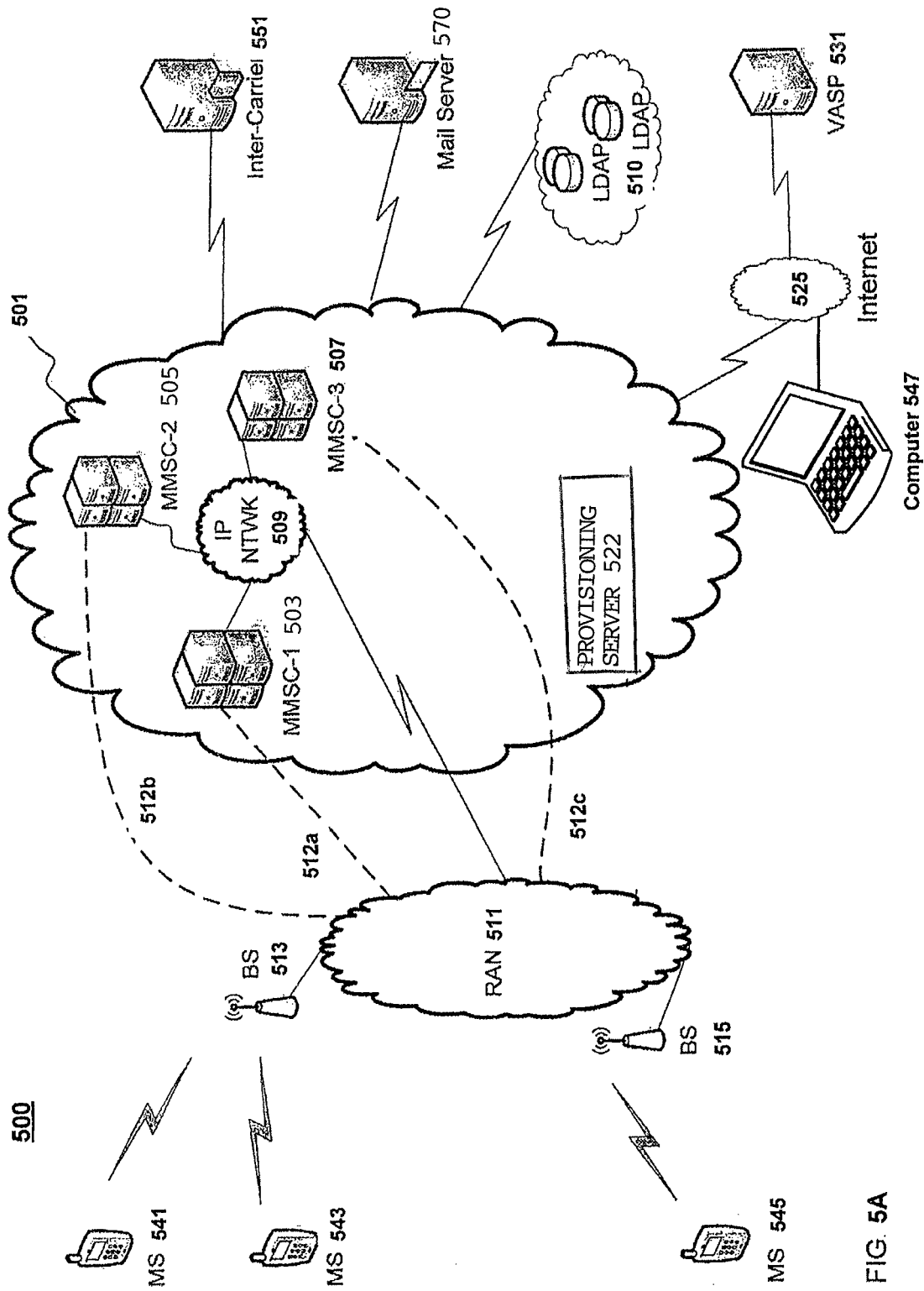
FIG. 5A is an exemplary block diagram of a network architecture of the present disclosure that provides MMS services, as well as several terminal devices communicating via the network.

FIG. 5A is an exemplary block diagram of a network architecture 500 that provides MMS services, as well as several users' terminal devices communicating via the network.

In an operator network that offers MMS services, a user may utilize the mobile station to make voice-based calls to other users, transfer data with other users, check mail, connect to the Internet, via the Radio Access Network (RAN) 511 and other network elements not shown. The RAN 511 also enables MSs 541, 543, and 545 to access the Network 501 over the air via any of the Base Stations (BSs) (BS 513 and 515). For discussion purposes, the drawing shows one such Radio Access Network 511, although those skilled in the art will recognize that large carriers operate a number of such networks.

RAN 511 is a generic portion of the wireless network that may include a number of base stations represented in the example by BS 513 and BS 515, each of which communicates over a number of air-links with one or more of the MS(s) 541, 543, and 545, when the mobile stations are within range. The network is capable of providing wireless mobile communications services to any number of mobile stations, and three stations are shown here only for purposes of our discussions of examples of several MMS communications. In the later discussions, we will assume that the MS 545 is a device of user trying to send a MMS message to a minor, the MS 543 is the mobile station of the minor, and the MS 541 is the mobile station of the adult associated with the minor who will screen the content of MMS messages addressed to the minor. However, it should be noted that other terminal devices such as a computer used by an adult to access e-mail or web content may also be used.

Each base station typically includes several antennae mounted on a radio tower within a coverage area often referred to as a "cell." BS 513 and BS 515 are the part of the RAN 511 that send and receive Radio Frequency (RF) signals to/from the mobile stations that each base station currently serves. BS 513 and BS 515 assign and reassign channels to the MS(s) like 541, 543, and 545 that they serve and monitor the signal levels to recommend hand-offs to other base stations. RAN 511 is connected to Network 501 via a network (not shown) that typically includes a base station controller (not shown) or a radio network controller (not shown) functionality that controls the functions of a number of base stations and helps to manage how calls made by each mobile station are transferred (or "handed-off") from one serving base station to another. Each wireless network equipment vendor implements this function differently. Some equipment vendors have a physical entity, which they call a base station controller (not shown), while other vendors include this functionality as part of their switch (not shown).

In FIG. 5A, the MS(s) 541, 543, and 545 can connect to any one of the in-range Base Stations (BS(s) 513 and 515) in order to make a call (i.e. voice) or to transfer/receive data, including SMS and MMS type mobile messaging service messages. MS(s) 541, 543, and 545 may communicate with other mobile stations or with another terminating device such as Computer 547 via Network 501 and Internet 525 in order to obtain MMS content. BS 513 and/or BS 515 provide wireless access points (WAP) to the RAN 511. In FIG. 5A, MSs 541 and 543 are connected to BS 513 via the air-link, and MS 545 is connected to BS 515 via the air-link. Furthermore, BS 513 and 515 can communicate with devices on the Internet 525 via other elements of RAN 511 and Network 501.

A message service center system routes a message, in this case a message from an originating mobile station which is operable within the wireless network. This message system with MMSC-1 503, MMSC-2 505, and MMSC-3 507, may route the message based on an URI corresponding to a target mobile directory number (MDN) inputted via the originating mobile station. The system also includes an tElephone Number Mapping (ENUM) server for storing URIs corresponding to MDNs of various mobile stations. It should be noted that although MDN is used to identify the mobile station in the current example, other identifiers, such as a Mobile Identification Number (MIN), may also be used.

The MMSC confirms that originating MDN is capable of sending MMS messages and the destination MDN is capable of receiving MMS messages using an authentication directory or database for the mobile stations. A directory is a set of objects with similar attributes organized in a logical and hierarchical manner. In an exemplary illustration, an authentication directory may consist of a series of records for the mobile stations serviced by the mobile network, with each mobile station having a MDN, email address, service level, etc. In the example, the authentication directory is implemented on a light weight directory access protocol (LDAP) server coupled for communication with the MMSC, although the directory or database may be implemented on the MMSC itself.

Lightweight Directory Access Protocol is used by the Authentication Directory 510 which is connected to Network 501 and MMSC(s) 503, 505, 507. The Lightweight Directory Access Protocol (LDAP) is an application protocol for querying and modifying directory services running over TCP/IP. In the example, LDAP is utilized by Network 501 and MMSC 503 for authentication of each mobile stations service level. The mobile station data typically enables validation of the mobile station, e.g., whether the mobile station is allowed to send a MMS message or to receive a MMS message, although such data may facilitate MMS service in some other fashion. Additionally, the mobile station may include information about whether the mobile station is that of a minor and, if so, will identify the mobile station or device of the adult associated with the minor. In an alternative design, an Authentication Database with subscriber attributes and capabilities may reside directly on a MMSC.

Network 501 includes MMSC(s) 503, 505, 507 and IP Network 509. The MMSC(s) serve to deliver multimedia messages of text, graphic, video, audio and other media formats to Mobile Stations supported by the operator network and to other Mobile Stations connected to other operators' networks that are connected to the operator's network via InterCarrier Network 551. Each MMSC acts as a focal point for exchange of multimedia based messages. The MMSC activates the sending flow when it receives a multimedia message sent from a Mobile Station, a VASP, an email server connected to the MMSC or an inter-carrier network connected to the MMSC.

Network 501 also includes a server for allowing subscribers into input information/changes with regard to their account or service profile, which for convenience here, we will refer to as a Provisioning Server 552. For example, the provisioning server may be a web site server accessible by mobile devices or PC type terminal devices that in turn provides access to account and profile records in a Vision Server (not separately shown) that updates the actual records/databases in the network to reflect the customer requested changes. Vision stands for Virtual Information System Integrated Online Network and is the main billing system used to house customer information and make changes to a customer's service profile. Here, through the particular interface (e.g., customer care, My Verizon web site, and interactive voice) offered by the Provisioning Server 552 the records in Vision is updated. Upon entry of a change via the Provisioning Server 552, Vision informs other system elements such as the authentication directory 510 to reflect the customer related changes. In this case, the authenticating directory 510 may get updated to reflect that the mobile station 543 is associated with a minor and MMS messages addressed to the minor must to be approved by an adult prior to being forwarded to the minor. In a similar fashion, the record for the mobile station 543 in the authenticating directory 510 may get updated to reflect that is the mobile station 541 that of the adult associated with the minor who will screen the content of MMS messages addressed to the minor.

Three MMSC(s) are shown for discussion purposes. It is noted that there may be fewer MMSC(s); but in typical public carrier network deployments, the Network 501 typically may include a large number of MMSC(s). MMSC-1 503, MMSC-2 505, MMSC-3 507 are connected to each other via IP Network 509. MMSC-1 503, MMSC-2 505, MMSC-3 507 allow messages to be exchanged between MSs 541, 543 and 545, mobile stations connected to other operator networks via Inter-Carrier Network 551, Mail Server 570, or VASP 531. In this current network configuration, the MMSC(s) are designed to support certain types of multi-function traffic such as P2P, person-to-email and P2A. Furthermore, MMSC-1 503, MMSC-2 505, MMSC-3 507 are connected to the RAN 511 via Logical Connections 512a, 512b and 512c. Logical Connection 512a provides a logical connection from MMSC-1 503 to RAN 511. Similarly, Logical Connection 512b provides a logical connection from MMSC-2 505 to RAN 511 and Logical Connection 512c provides a logical connection from MMSC-3 507 to RAN 511.

Network 501 is also connected to IC Network 551 and Email Server 570. By maintaining connections to Email Server 570, mobile stations connected to Network 501 may send and receive email. Furthermore, mobile stations connected to Network 501 may transfer data and voice with users of other operator networks via Inter-Carrier Network 551.

Figure 5B:
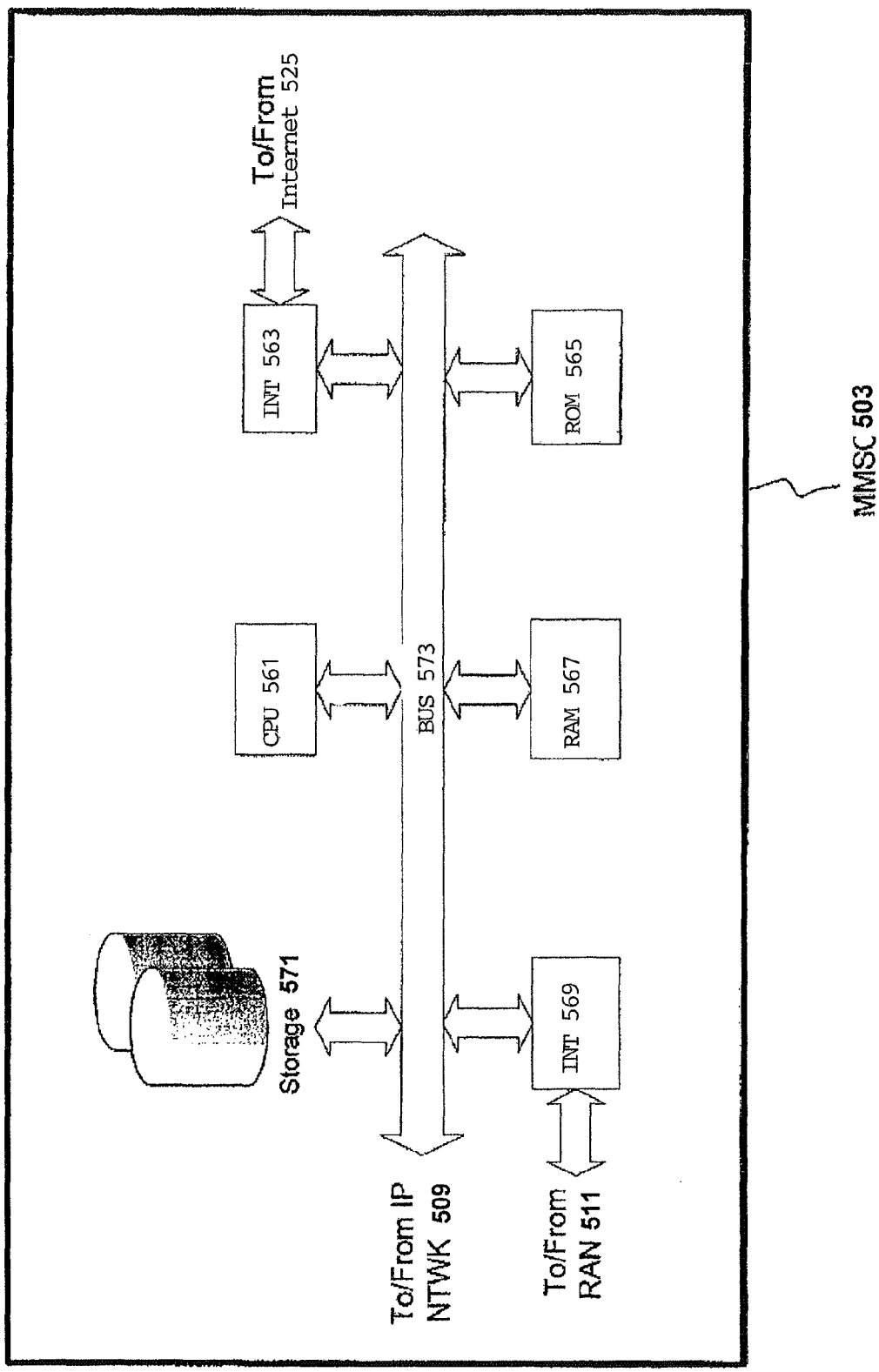
FIG. 5B is an exemplary block diagram of a typical MMSC of the present disclosure that provides MMS services.

FIG. 5B is an exemplary block diagram of a MMSC that provides MMS message communication services and may be adapted to allow an adult to determine whether or not to permit delivery of content to a minor's mobile station.

Although special purpose hardware may be used, the example of FIG. 5B assumes the use of a general purpose platform such as that might typically be used as a host or server. The exemplary MMSC 503 thereof includes one or more processors serving as a Central Processing Unit (CPU) 561. The MMSC 503 also has Read-Only Memory (ROM) 565, Random Access Memory (RAM) 567, Interface(s) 563 and 569, BUS 573, and one or more mass Storage devices shown as disk drives at 571.

The BUS 573 provides internal connectivity of the components contained within the MMSC 503. Thus, the CPU 561, Interface(s) 563 and 569, ROM 565, RAM 567, and Storage 571 are connected to each other via the BUS 573. The BUS 573 and Interface 563 provide a logical communication connection to/from the IP Network 509 for the MMSC 503. Similarly, the BUS 573 and Interface 563 provide a logical connection to/from the Internet 525 and Computer 547 for communications of the MMSC 503. The BUS 573 and Interface 569 provide a logical connection to/from the RAN 511 for communications of the MMSC 503.

The CPU 561 performs the processing operations of any executable code stored in the MMSC 503, e.g., from ROM 565, RAM 567 and/or Storage 571. The Interface (INT) 563 provides an interface to/from the BUS 573 of the MMSC 503 to/from Internet 525. The Interface (INT) 569 provides an interface to/from the BUS 573 of the MMSC 503 to/from RAN 511.

The ROM 565 is a class of storage media utilized in the MMSC 503. While traditional ROM devices contained permanent data, more modern types, e.g. Erasable Programmable Read-Only Memory (EPROM) and flash Electrically Erasable Programmable Read-Only Memory (EEPROM), can be erased and re-programmed multiple times.

The RAM 567 performs data storage to allow the stored data to be accessed in any order, i.e., at random.

The Storage Medium (Storage) 571 provides all other storage capabilities of the MMSC 503. Some programming may reside in Storage 571, before being uploaded to the RAM 567 for execution. In the MMSC 503, Storage 571 also provides the means to store the various multimedia messages going to and/or from mobile stations. For example, the Storage 571 may include a floppy disk, a flexible disk, hard disk, magnetic tape, any other magnetic medium, a (Compact Disc Read-Only Memory) CD-ROM, Digital Versatile Disc (DVD) or Digital Versatile Disc Read-Only Memory (DVD-ROM), any other optical medium, punch cards paper tape, any other physical storage medium with patterns of holes, a RAM, a Programmable Read-Only Memory (PROM) and EPROM, a Flash-EPROM, any other memory chip or cartridge, a carrier wave transporting data or instructions, cables or links transporting such a carrier wave, or any other medium from which a computer can read programming code and/or data.

Figure 6:
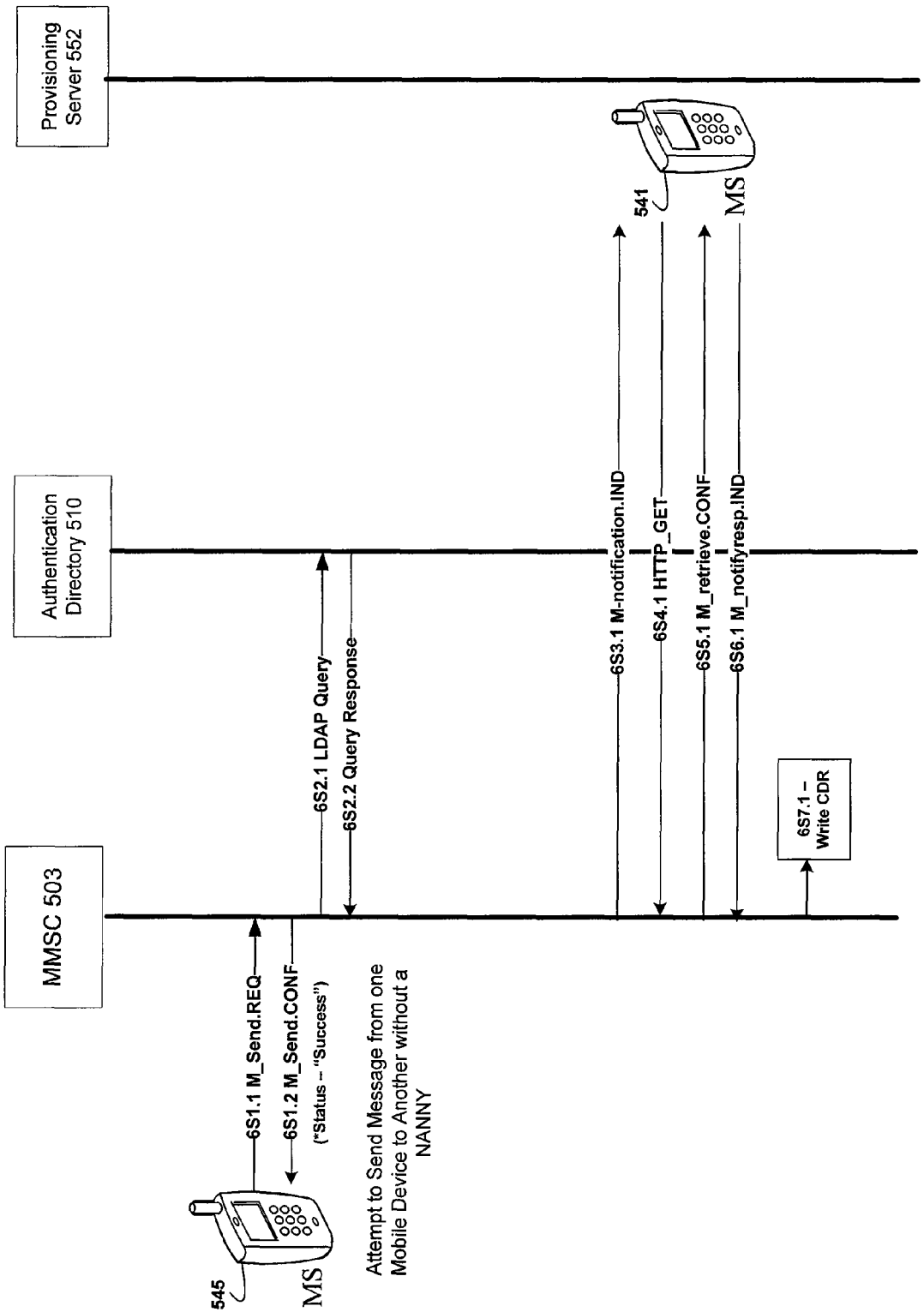
FIG. 6 is a signal flow diagram for a MMS message communication that is not subject to content review and approval by an adult.

FIG. 6 is a signal flow diagram for a MMS message communication, depicting an example of a mobile call flow of a MMS message from MS 545 to MS 541. This drawing shows how a MMS message can travel through the network from one mobile station to another, without content screening by an adult (not to a station identified as that of a minor).

FIG. 6 illustrates a MMS system including functionality of routing SMS and MMS messages through a typical mobile device network. The MMS system may include various network types, such as 2G mobile networks, 3G mobile networks, internets, etc. The network interface is accommodated via internet protocols as well as other related network message protocols. In addition, the multimedia messages transfer protocols on the 2G/3G mobile network can be compatible with the existing multimedia message transfer protocols on the Internet.

The MMS protocol is a standard for sending and receiving multimedia messages in a non-real-time communication mode. MMS is designed to reuse existing wireless and Internet protocols. MIME is chosen as the way of packing up the different media components of the message. The MMS session is managed by Wireless Access Protocol (WAP), Internet Message Access Protocol (IMAP) or Session Initiation Protocol (SIP), all of which run over IP. This fits into existing wireless packet data technologies, e.g. General Packet Radio Service (GPRS), Code Division Multiple Access (CDMA) 1X, which are IP based.

The typical format of a MMS message comprises headers that provide the routing information and addresses of the recipients and senders of the MMS message, i.e., originating and destination address information. Further, a message body includes the multimedia message content, which may comprise different types or portions of multimedia content. By way of non-limiting example, such content may include: image content represented according to one or more image coding formats (e.g., JPEG, PNG, Bitmap, Graphics Interchange Format (GIF)); formatted or plain text; audio content represented according to one or more audio coding formats (e.g., MP3, WAVeform (WAV), AMR, Enhanced Variable Rate CODEC (EVRC), Selectable Mode Vocoder (SMV) and Qualcomm Code Excited Linear Prediction (QCELP) etc.); and video content represented according to one or more video coding formats (e.g., MPEG and H.263).

Referring now to FIG. 6, assume that the sending mobile station MS 545 sends a MMS message intended for MMS 541. This message includes multimedia content, such as text, graphics, digital photographs, audio files or video clips, via non-real-time transmission. A MMS user agent is installed in the mobile station to support the multimedia messaging services. The MMS user agent is installed on mobile stations MS 545 and MS 541 to provide multimedia messaging services. The MMS user agent is one of the applications on the user terminal, which provides capabilities for viewing, editing, and handling multimedia messages. Execution of the agent enables the user of the respective mobile station to send, receive, and delete multimedia messages. The MMS user agent in our example supports the Multipurpose Internet Mail Extension (MIME) protocols. Multimedia messages are represented in the MIME format. Based on various type fields, a multimedia message may contain text, picture, audio, and/or video information.

The mobile stations MS 545 and MS 541 may take many forms. For example, some mobile stations may be mobile telephone stations, at least some with enhanced display and user input capabilities to support browsing and other data communications applications in addition to voice telephone service. Some of these data services may be location based and require a fix on a position of the mobile station. Other mobile stations may comprise Portable Digital Assistants (PDAs) with built-in wireless communication capabilities. As another alternative, a wireless device such as a mobile transceiver having data communication capabilities may be connected to a portable computing device such as a handheld or laptop type computer such as Computer 547 shown in FIG. 5A.

With reference to the signal flow in the drawings, at 6S1.1 an "M_send.REQ message is sent from MS 545 to MMSC-1 503. The "M_send.REQ" message is received by MMSC-1 503 via BS 515 and RAN 511 (shown in FIG. 5A). The "M_send.REQ" message requests sending of a MMS message-type from a request from the MMSC(s). The "M_send.REQ" MMS message will contain a multimedia content in addition to the sender's address. The "M_send.REQ" signaling message will also include the destination address(es) for the MMS message, so that the MMSC processing the message knows to whom to deliver the MMS message. In this example and those that follow, the sender's address is of the MDN format (e.g., MDN of the sending MS) and the destination address is of the MDN format (e.g., MDN of the intended destination MS). However, other mobile number formats such as MIN may also be used. If the message originates at a server of a content provider, such as a VASP, the senders address may be in the short code format. Those skilled in the art will recognize that the general examples can readily be adapted to different applications, for example, if an email message was sent then the addressing scheme would conform to the RFC-822 standard for email messages; if a P2P message is sent, then the addressing scheme would be in a MDN format. The "M_send.REQ" message sent from MS 545 to MMSC-1 503 utilizes the MM1 interface.

At 6S1.2, MMSC-1 503 responds to Mobile Stations MMS request by sending a "M_send.CONF" message to MS 545. The "M_send.CONF" message is received by MS 545 via BS 515 (not shown) and RAN 511 (not shown). The "M_send.CONF" message is a confirmation message utilized to confirm receipt of the MMS message.

At 6S2.1 and 6S2.2, MMSC 503 validation is performed. Validation verifies that the destination address of the MMS message is that of a valid subscriber; in other words whether the Network 501 should send MMS messages of this sort to MS 541 identified by the MDN in the message. Furthermore, validation verifies that the source of the MMS service request is valid; in other words that the MS 545 is capable of sending the MMS message. Validation of the source requires that the entity sending the MMS message, in this case, MS 545, is registered with the MMSC 503 and is capable of sending MMS messages. If the MS 545 is not registered or is not capable of sending MMS messages in the MMSC 503, then the MMS message sent. However, if the Network 501 validates the source and destination addresses, then MMS 545 send the MMS message through the Network 501 to MMS 541. It is noted that the MMSC 503 may communicate with the Authentication Direction 510 via LDAP to obtain relevant data from a subscriber record of the mobile stations.

At 6S3.1, MMSC 503 sends a "M_notification.IND" message to MS 541. The "M_notification.IND" message is delivered to MS 541 via BS 513 and RAN 511 (shown in FIG. 5A). The "M_notification.IND" message serves as a "notification indicator" that the payload portion of the A2P MMS message is available for retrieval. Furthermore, the "M_notification.IND" message wakes up the MMS client of the mobile device.

At 6S4.1, MS 541 sends a "HTTP_GET" message to MMSC 503 from which it received notice in step 6S3.1. The "HTTP_GET" message delivered to MMSC 503 via BS 513 and RAN 511 (shown in FIG. 5A). The "HTTP_GET" message requests delivery of the MMS message from the MMSC 503. The "HTTP_GET" message utilized the MM1 interface.

At 6S5.1, MMSC 503 sends a "M_retrieve.CONF" message to MS 541. The "M_retrieve.CONF" or "retrieve confirmation" message is delivered to MS 541 via BS 513 and RAN 511 (not shown). The "M_retrieve.CONF" message serves as a delivery message of the payload portion of the A2P MMS message and this provides the content supplied by MMS 545 to the MMSC 503 to the MS 541. The "M_retrieve.CONF" message utilizes the MM1 interface.

At 6S6.1, MS 541 sends a "M_notifyresp.IND" message to MMSC 503. The "M_notifyresp.IND" message is delivered to MMSC 503 via RAN 511 and BS 513 (shown in FIG. 5A). The "M_notifyresp.IND" or "Notification Response Indicator" serves as a delivery report of the earlier requested MMS A2P service(s). The "Notification Response Indicator" updates the MMSC 503 that it has successfully received the payload portion of the MMS message. Thus, the MMSC 503 is informed that the earlier MMS message was retrieved successfully by the MS 541. The "M_notifyresp.IND" message utilizes the MM1 interface.

At 6S7.1, the MMSC(s) will verify and/or write the CDR. The CDR is retrieved and processed for the Network 501 to bill the mobile station (MS 545) for the MMS services rendered.

While the message flow above may be used to send a message through the network from one mobile station to another, this procedure does not allow adult review if the destination mobile station is that of a minor. Applicants have developed methods that may be used to allow adult review of the MMS messages addressed to a minor prior to receipt by the minor. The procedure of FIG. 6, however, would continue to apply to MMS message communications via a network 501 that are addressed to mobile stations like 541 that are not the devices used by minors.

FIGS. 1 to 4 show signal flows for MMS communications addressed to a mobile station of a minor, with attendant MMS message screening and approval or rejection by the adult associated with the minor mobile station. The illustrated flows omit some detailed steps that are not necessary to understanding of the concepts under discussion but as a result should make the examples easy to understand and provide more focus on the topics of greatest interest to the reader. The examples are not intended to be exhaustive with respect to all of the different scenarios that may arise in MMS services. Instead, those skilled in the art will recognize that the general examples can readily be adapted to different applications.

Figure 1:
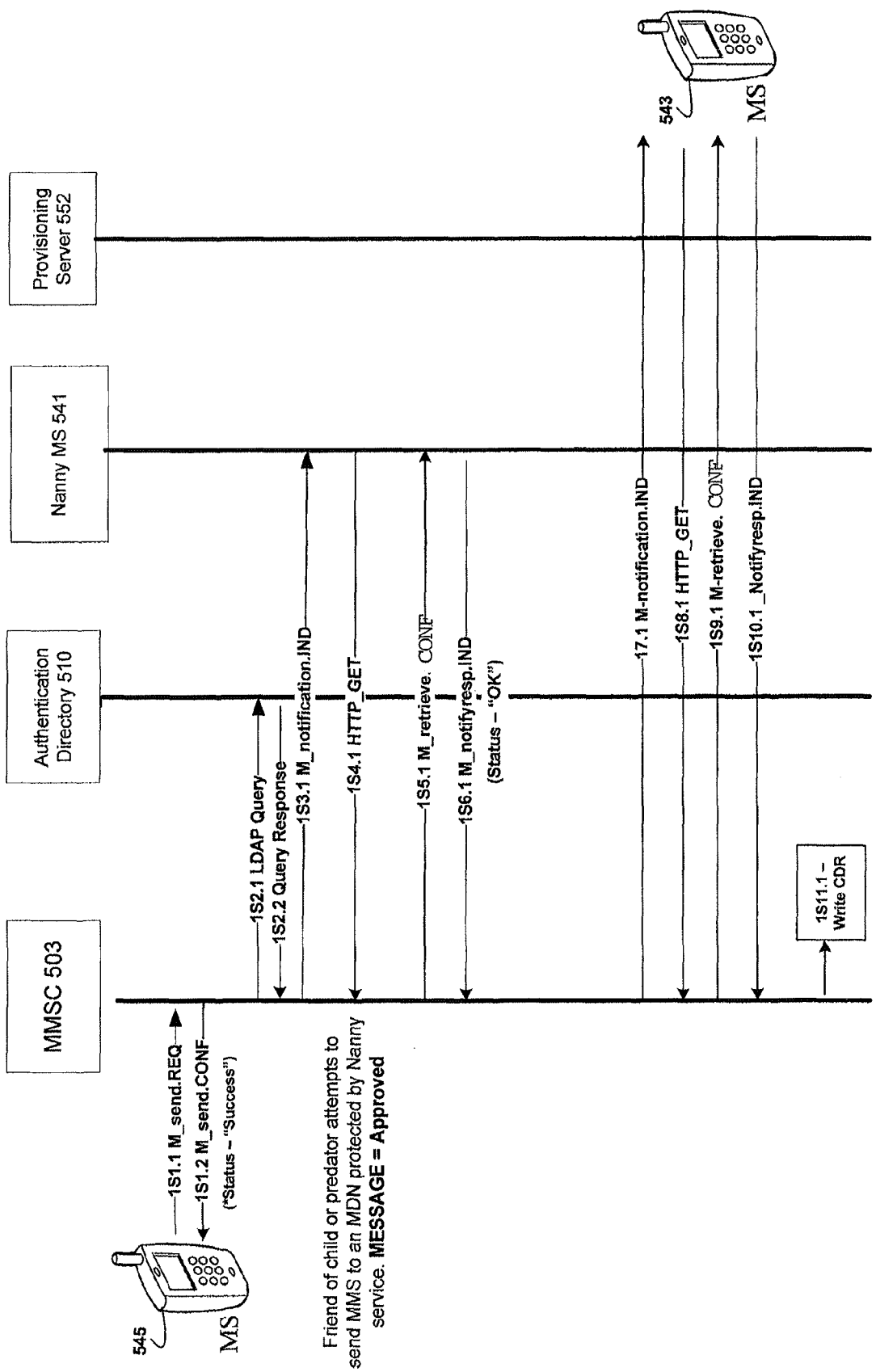
FIG. 1 is a signal flow diagram for MMS communication, when a MMS message is approved by an adult associated with the mobile station of a minor for delivery to the mobile station.

FIG. 1 is a signal flow diagram for MMS communication, when the MMS message is screened and approved by the adult associated with the minor mobile station for delivery to the mobile station. With reference to the signal flow in the drawing, at 1S1.1, an "M_send.REQ" message is sent from MS 545 to MMSC-1 503. The "M_send.REQ" message is received by MMSC-1 503 via BS 515 and RAN 511 (shown in FIG. 5A). The "M_send.REQ" message requests sending of a MMS message-type from a request from the MS 545. The "M_send.REQ" MMS message will contain a multimedia content in addition to the sender's address. The "M_send.REQ" signaling message will also include the destination address(es) for the MMS message, so that the MMSC 503 processing the message knows to whom to deliver the MMS message. In this exemplary illustration, the sender's address is of the MDN format (e.g., MDN of the sending MS) and the destination address is of the MDN format (e.g., MDN of the intended destination MS). If the message originates at a server of a content provider, such as a VASP, the senders address may be in the short code format. Those skilled in the art will recognize that the general examples can readily be adapted to different applications, for example, if an email message was sent then the addressing scheme would conform to the RFC-822 standard for email messages; if a P2P message is sent, then the addressing scheme would be in a MDN format. The "M_send.REQ" message sent from MS 545 to MMSC-1 503 utilizes the MM1 interface.

At 1S1.2, MMSC-1 503 responds to Mobile Stations MMS request by sending a "M_send.CONF" message to MS 545. The "M_send.CONF" message is received by MS 545 via BS 515 (not shown) and RAN 511 (not shown). The "M_send.CONF" message is a confirmation message utilized to confirm receipt of the MMS message.

At 1S2.1, MMSC sends a query to Authentication Directory 510 using LDAP and receives a response therefrom at 1S2.2 in order to validate the message transfer. The MMSC 503 communicates with the Authentication Directory 510 to obtain relevant data from a subscriber record of the mobile stations. Validation verifies that the destination address of the MMS message is that of a valid subscriber; in other words if the Network 501 should send MMS messages of this sort to MS 543 identified by the MDN in the message. Furthermore, validation verifies that the source of the MMS service request is valid; in other words that the MS 545 is capable of sending the MMS message. Validation of the source requires that the entity sending the MMS message, in this case, MS 545, is registered with the MMSC 503 and is capable of sending MMS messages. If the MS 545 is not registered or is not capable of sending MMS messages in the MMSC 503, then the MMS message is not sent. MMSC 503 also validates the destination mobile station to determine whether the mobile station is capable of receiving MMS messages. During this validation, the MMSC 503 also determines that the destination mobile station MS 543 is the mobile station of the minor. If the MMSC 503 obtains such information from the Authentication Directory 510, identification of the device associated with the adult will also be identified. For purposes of the current example, device of the adult is a mobile device identified by Nanny MS 541, but it is also possible that communication with the adult may occur by sending the adult a notification message via an e-mail address stored as associated with the minor's mobile station. In that particular example, the approval must come from a specific account associated with the adult rather than a device.

Once the MMSC 503 determines that the mobile station 543 is a mobile station of a minor, the MMSC 503 will send an "M_notification.IND" message through the Network 501 to the Nanny mobile station 541 at 1S3.1. The "M_notification.IND" message is delivered to Nanny MS 541 via BS 513 and RAN 511 (shown in FIG. 5A). The "M_notification.IND" message serves as a "notification indicator" that the payload portion of the MMS message is available for retrieval. Furthermore, the "M_notification.IND" message wakes up the MMS client of the mobile station.

At 1S4.1, Nanny MS 541 sends a "HTTP_GET" message to MMSC 503 from which it received notice in step 2S3.1. The "HTTP_GET" message delivered to MMSC 503 via BS 513 and RAN 511 (shown in FIG. 5A). The "HTTP_GET" message requests delivery of the MMS message from the MMSC 503. The "HTTP_GET" message utilized the MM1 interface.

At 1S5.1, MMSC 503 sends a "M_retrieve.CONF" message to Nanny MS 541. The "M_retrieve.CONF" or "retrieve confirmation" message is delivered to Nanny MS 541 via BS 513 and RAN 511 (not shown). The "M_retrieve.CONF" message serves as a delivery message of the payload portion of the A2P MMS message and this provides the content supplied by MMS 545 to the MMSC 503 to the Nanny MS 541. The "M_retrieve.CONF" message utilizes the MM1 interface.

At 1S6.1, Nanny MS 541 sends a "M_notifyresp.IND" message to MMSC 503. The "M_notifyresp.IND" message is delivered to MMSC 503 via RAN 511 and BS 513 (shown in FIG. 5A). The "M_notifyresp.IND" or "Notification Response Indicator" serves as a delivery report of the earlier requested MMS message. The "Notification Response Indicator" updates the MMSC 503 that it has successfully received the payload portion of the MMS message. Thus, the MMSC 503 is informed that the earlier MMS message was retrieved successfully by the MS 541. Additionally, the "M_notifyresp.IND" message informs the MMSC 503 whether the MMS message has been approved or disapproved for delivery to the minor MS 543. "The "M_notifyresp.IND" message utilizes the MM1 interface.

If the MMS message has been approved by Nanny MS 541, the MMSC 503 will send an "M_notification.IND" message to minor MS 543 at 157.1. "M_notification.IND" message through the Network 501 to the minor MS 543. The "M_notification.IND" message is delivered to minor MS 543 via BS 513 and RAN 511 (shown in FIG. 5A). The "M_notification.IND" message serves as a "notification indicator" that the payload portion of the MMS message is available for retrieval. Furthermore, the "M_notification.IND" message wakes up the MMS client of the mobile station.

At 1S8.1, minor MS 543 sends a "HTTP_GET" message to MMSC 503 from which it received notice in step 1S7.1. The "HTTP_GET" message delivered to MMSC 503 via BS 513 and RAN 511 (shown in FIG. 4). The "HTTP_GET" message requests delivery of the A2P MMS message from the MMSC 503. The "HTTP GET" message utilized the MM1 interface.

At 1S9.1, MMSC 503 sends a "M_retrieve.CONF" message to minor MS 543. The "M_retrieve.CONF" or "retrieve confirmation" message is delivered to minor MS 543 via BS 513 and RAN 511 (not shown). The "M_retrieve.CONF" message serves as a delivery message of the payload portion of the A2P MMS message and this provides the content supplied by MMS 545 to the MMSC 503 to the minor MS 543. The "M_retrieve.CONF" message utilizes the MM1 interface.

At 1S10.1, minor MS 543 sends a "M_notifyresp.IND" message to MMSC 503. The "M_notifyresp.IND" message is delivered to MMSC 503 via RAN 511 and BS 513 (shown in FIG. 5A). The "M_notifyresp.IND" or "Notification Response Indicator" serves as a delivery report of the earlier requested MMS message The "Notification Response Indicator" updates the MMSC 503 that it has successfully received the payload portion of the MMS message. Thus, the MMSC 503 is informed that the earlier MMS message was retrieved successfully by the MS 543. "The "M_notifyresp.IND" message utilizes the MM1 interface.

At step 1S11.1, the MMSC(s) will verify and/or write the CDR. The CDR is retrieved and processed for the Network 501 to bill the mobile station (MS 545) for the MMS services rendered. This will occur once validation is complete and the message is sent successfully, regardless of whether or not the MMS message ever reaches the minor MS 543. Additionally, this allows the telephone company to keep a record of the messages sent by the sender. After a message is retrieved by the mobile station of the minor from the MMSC, the MMSC generally deletes the message from the storage 571 (shown in FIG. 5B).

Figure 2:
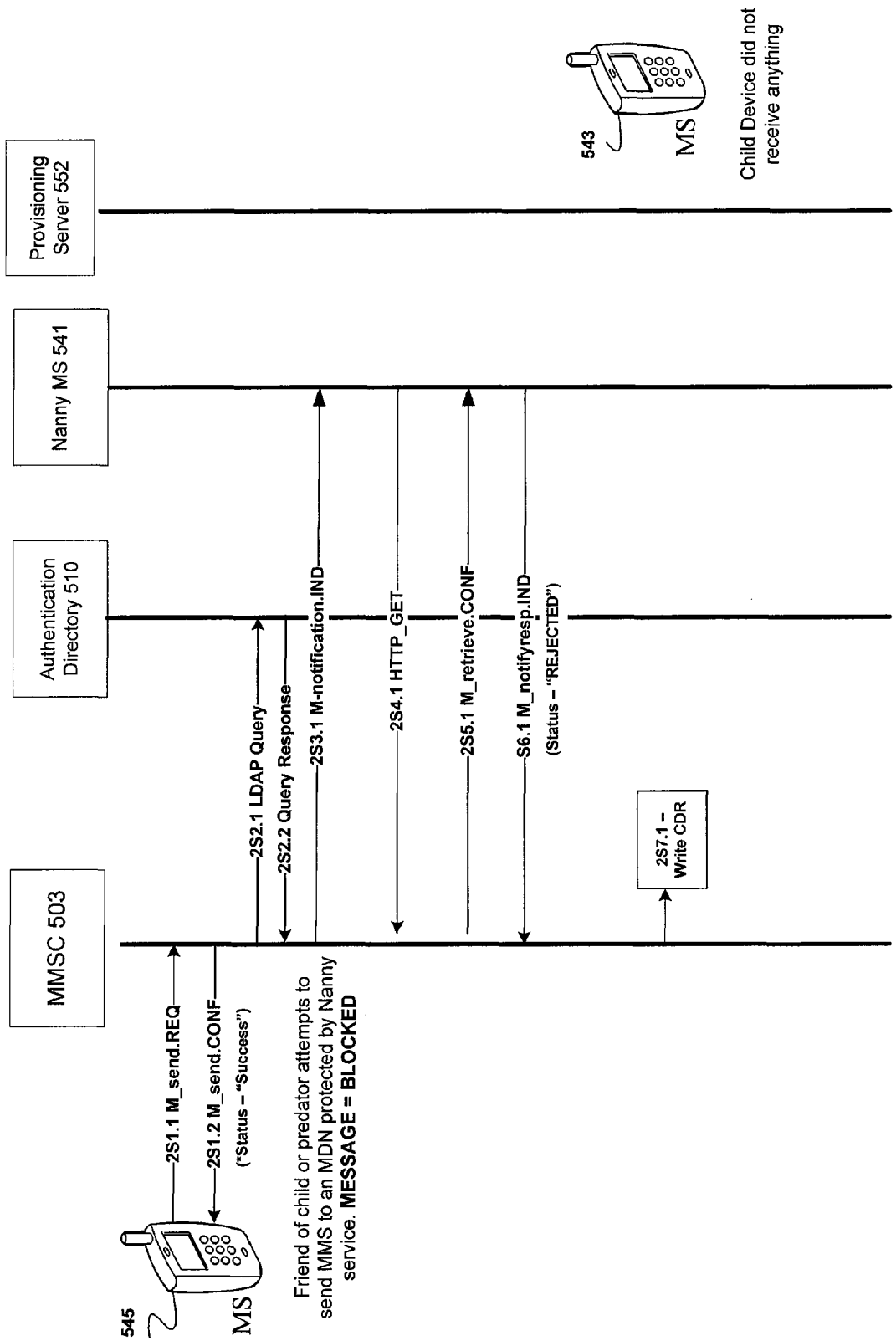
FIG. 2 is a signal flow diagram for MMS communication, where a MMS message is blocked from reaching the mobile station of the minor by an adult associated with the mobile station of the minor.

The adult may also choose to disapprove the MMS message intended for minor MS 543. FIG. 2 is a signal flow diagram for MMS communication, where the MMS message is blocked from reaching the mobile station of the minor by the adult associated with the mobile station of the minor.

With reference to the signal flow in the drawings, at 2S1.1, an "M_send.REQ" message is sent from MS 545 to MMSC-1 503. The "M_send.REQ" message is received by MMSC-1 503 via BS 515 and RAN 511 (shown in FIG. 5A). The "M_send.REQ" message requests sending of a MMS message-type from a request from the MS 545. The "M_send.REQ" MMS message will contain a multimedia content in addition to the sender's address. The "M_send.REQ" signaling message will also include the destination address(es) for the MMS message, so that the MMSC 503 processing the message knows to whom to deliver the MMS message. In this exemplary illustration, the sender's address is of the MDN format (e.g., MDN of the sending MS) and the destination address is of the MDN format (e.g., MDN of the intended destination MS). If the message originates at a server of a content provider, such as a VASP, the senders address may be in the short code format. Those skilled in the art will recognize that the general examples can readily be adapted to different applications, for example, if an email message was sent then the addressing scheme would conform to the RFC-822 standard for email messages; if a P2P message is sent, then the addressing scheme would be in a MDN format. The "M_send.REQ" message sent from MS 545 to MMSC-1 503 utilizes the MM1 interface.

At 2S1.2, MMSC-1 503 responds to Mobile Stations MMS request by sending a "M_send.CONF" message to MS 545. The "M_send.CONF" message is received by MS 545 via BS 515 (not shown) and RAN 511 (not shown). The "M_send.CONF" message is a confirmation message utilized to confirm receipt of the MMS message.

At 2S2.1, MMSC sends a query to Authentication Directory 510 using LDAP and receives a response therefrom at 2S2.2 in order to validate the message transfer. The MMSC 503 communicates with the Authentication Directory 510 to obtain relevant data from a subscriber record of the mobile stations. Validation verifies that the destination address of the MMS message is that of a valid subscriber; in other words if the Network 501 should send MMS messages of this sort to MS 541 identified by the MDN in the message. Furthermore, validation verifies that the source of the MMS service request is valid; in other words that the MS 545 is capable of sending the MMS message. Validation of the source requires that the entity sending the MMS message, in this case, MS 545, is registered with the MMSC 503 and is capable of sending MMS messages. If the MS 545 is not registered or is not capable of sending MMS messages in the MMSC 503, then the MMS message is not sent. MMSC 503 also validates the destination mobile station to determine whether the mobile station is capable of receiving MMS messages. During this validation, the MMSC 503 also determines that the destination mobile station 543 is the mobile station of the minor. If the MMSC 503 obtains such information from the Authentication Directory 510, identification of the device associated with the adult will also be identified. For purposes of the current example, device of the adult is a mobile device identified by Nanny MS 541, but it is also possible that communication with the adult may occur by sending the adult a notification message via an e-mail address stored as associated with the minor's mobile station.

Once the MMSC 503 determines that the mobile station 543 is a mobile station of the minor, the MMSC 503 will send an "M_notification.IND" message through the Network 501 to the Nanny mobile station 541 at 2S3.1. The "M_notification.IND" message is delivered to Nanny MS 541 via BS 513 and RAN 511 (shown in FIG. 5A). The "M_notification.IND" message serves as a "notification indicator" that the payload portion of the MMS message is available for retrieval. Furthermore, the "M_notification.IND" message wakes up the MMS client of the mobile station.

At 2S4.1, Nanny MS 541 sends a "HTTP_GET" message to MMSC 503 from which it received notice in step 253.1. The "HTTP_GET" message delivered to MMSC 503 via BS 513 and RAN 511 (shown in FIG. 5A). The "HTTP_GET" message requests delivery of the MMS message from the MMSC 503. The "HTTP_GET" message utilized the MM1 interface.

At 2S5.1, MMSC 503 sends a "M_retrieve.CONF" message to Nanny MS 541. The "M_retrieve.CONF" or "retrieve confirmation" message is delivered to Nanny MS 541 via BS 513 and RAN 511 (not shown). The "M_retrieve.CONF" message serves as a delivery message of the payload portion of the A2P MMS message and this provides the content supplied by MMS 545 to the MMSC 503 to the Nanny MS 541. The "M_retrieve.CONF" message utilizes the MM1 interface.

At 2S6.1, Nanny MS 541 sends a "M_notifyresp.IND" message to MMSC 503. The "M_notifyresp.IND" message is delivered to MMSC 503 via RAN 511 and BS 513 (shown in FIG. 5A). The "M_notifyresp.IND" or "Notification Response Indicator" serves as a delivery report of the earlier requested MMS message. The "Notification Response Indicator" updates the MMSC 503 that it has successfully received the payload portion of the MMS message. Thus, the MMSC 503 is informed that the earlier MMS message was retrieved successfully by the MS 541. Additionally, the "M_notifyresp.IND" message informs the MMSC 503 whether the MMS message has been approved or disapproved for delivery to the minor MS 543. "The "M_notifyresp.IND" message utilizes the MM1 interface. Once the MMSC receives the "M_notifyresp.IND" message with the notification that delivery of the MMS message to minor MS 543 has been blocked/disproved, the MMSC may remove delete the message.

At 2S7.1 the MMSC(s) will verify and/or write the CDR. The CDR is retrieved and processed for the Network 501 to bill the mobile station (MS 545) for the MMS services rendered. This will occur once validation is complete and the message is sent successfully, regardless of whether or not the MMS message ever reaches the minor MS 543. Additionally, this allows the telephone company to keep a record of the messages sent by the sender, but also whether such messages have been approved or disapproved. Such information may be useful to law enforcement or the like if the MS 545 is determined to be a mobile station of a predator. If it is determined that the sender regularly send messages to minors that are disallowed, this information could be used by law enforcement to identify someone who may be dangerous to children. After determining the MMS message should not be forwarded through the network to the MS 543, the MMSC generally deletes the message from the storage 571.

If the mobile station of the minor receives a large number of MMS messages, reviewing all of the messages may become too tiresome for the adult, especially when multiple MMS messages are sent from the same sender terminal device. In such a situation, the adult may decide to preauthorize or block the sender based on the identity of the sender, the content of previous MMS messages, or for any other reason.

Figure 3:
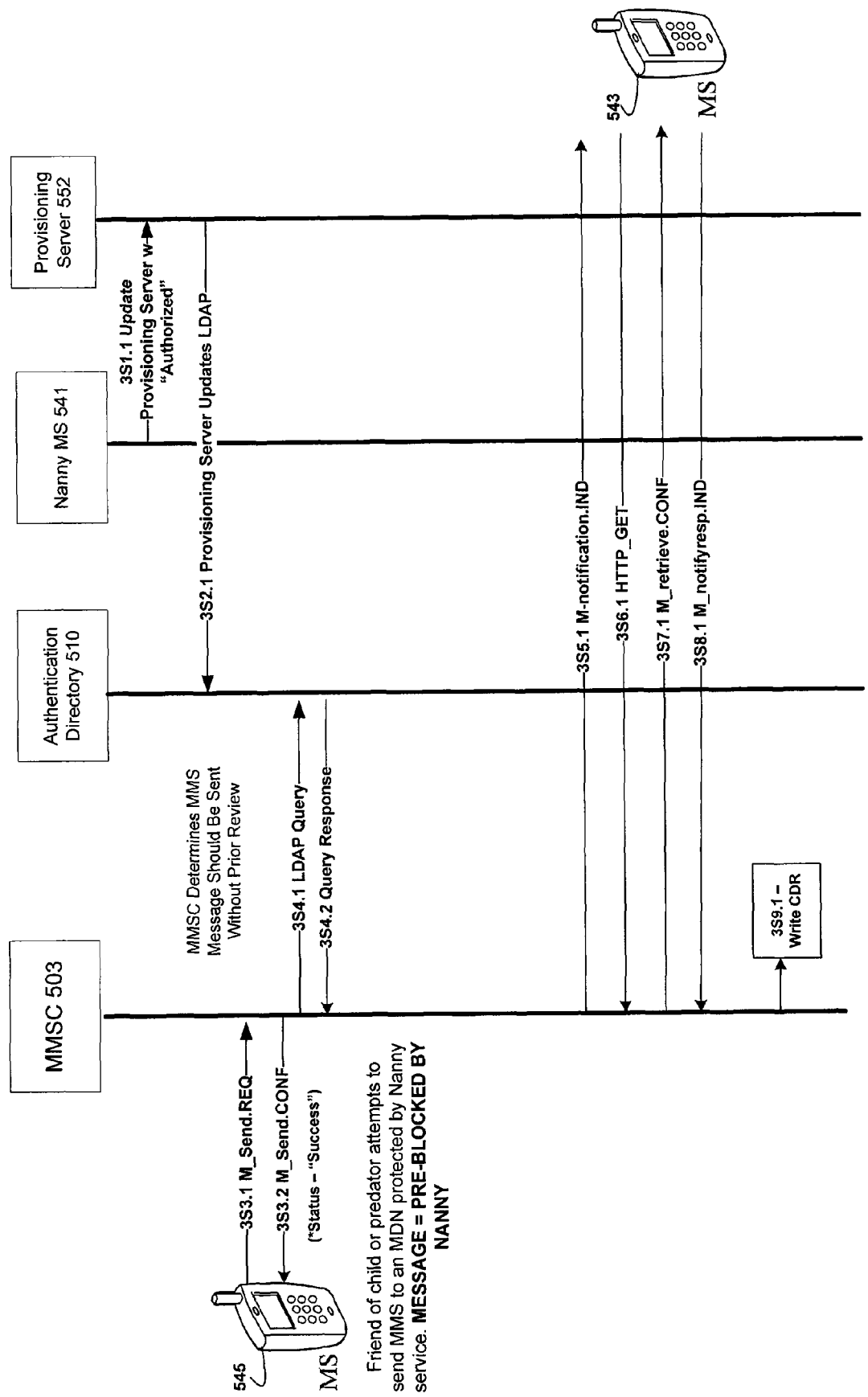
FIG. 3 is a signal flow diagram for MMS communication, where a sender of a MMS message is preauthorized to send MMS messages to a mobile station of the minor.

FIG. 3 is an exemplary signal flow diagram for MMS communication when the adult preauthorizes the MS 545 to send MMS messages to the minor. At step 3S1.1, the adult sends preauthorization request to Provisioning Server 552. In the current example the authorization comes from the Nanny MS 541 but it should be noted that authorization may come from the adult by accessing the Network in other ways. For example, the adult may access the provider website and create a list of "authorized" mobile numbers or senders associated with the mobile station of the minor. If a MMS message is sent from a preauthorized mobile station, then the MMSC need not seek prior approval from the device associated with the adult before sending the MMS message to the mobile station of the minor.

Once Nanny MS 541 has sent its preauthorization to the Provisioning Server 552, the Provisioning Server 552 updates the Authentication Directory 510 with such information at 3S2.1. Provisioning Server updates the Authentication Directory 510 with the preauthorization information such that when LDAP determines a MMS message is sent to minor mobile station MS 543, the MMSC need not send the MMS message to Nanny MS 541 for approval.

When a number is preauthorized, the Nanny MS 541 does not receive the MMS message before it is sent to minor station MS 543. At 3S3.1, an "M_send.REQ" message is sent from MS 545 to MMSC-1 503. The "M_send.REQ" message is received by MMSC-1 503 via BS 515 and RAN 511 (shown in FIG. 5A). The "M_send.REQ" message requests sending of a MMS message-type from a request from the MS 545. The "M_send.REQ" MMS message will contain a multimedia content in addition to the sender's address. The "M_send.REQ" signaling message will also include the destination address(es) for the MMS message, so that the MMSC 503 processing the message knows to whom to deliver the MMS message. In this exemplary illustration, the sender's address is of the MDN format (e.g., MDN of the sending MS) and the destination address is of the MDN format (e.g., MDN of the intended destination MS). If the message originates at a server of a content provider, such as a VASP, the senders address may be in the short code format. Those skilled in the art will recognize that the general examples can readily be adapted to different applications, for example, if an email message was sent then the addressing scheme would conform to the RFC-822 standard for email messages; if a P2P message is sent, then the addressing scheme would be in a MDN format. The "M_send.REQ" message sent from MS 545 to MMSC-1 503 utilizes the MM1 interface.

At 3S3.2, MMSC 503 responds to MS 545's MMS request by sending a "M_send.CONF" message to MS 545. The "M_send.CONF" message is received by MS 545 via BS 515 (not shown) and RAN 511 (not shown). The "M_send.CONF" message is a confirmation message utilized to confirm receipt of the MMS service request message.

At 3S4.1, MMSC sends a query to Authentication Directory 510 using LDAP and receives a response therefrom at 3S4.2 in order to validate the message transfer. The MMSC 503 communicates with the Authentication Directory 510 to obtain relevant data from a subscriber record of the mobile stations. Validation verifies that the destination address of the MMS message is that of a valid subscriber; in other words if the Network 501 should send MMS messages of this sort to MS 541 identified by the MDN in the message. Furthermore, validation verifies that the source of the MMS service request is valid; in other words that the MS 545 is capable of sending the MMS message. Validation of the source requires that the entity sending the MMS message, in this case, MS 545, is registered with the MMSC 503 and is capable of sending MMS messages. If the MS 545 is not registered or is not capable of sending MMS messages in the MMSC 503, then the MMS message is not sent. MMSC 503 also validates the destination mobile station to determine whether the mobile station is capable of receiving MMS messages. During this validation, the MMSC 503 also determines that the destination mobile station 543 is the mobile station of the minor. If the MMSC 503 obtains such information from the Authentication Directory 510, the preauthorization list will also be identified and reviewed to determine whether MS 545 is preauthorized to send MMS messages to the minor MS 543. If it is determined that MS 545 is preauthorized to send MMS messages to the mobile station of the minor, MMSC will not need to send the MMS message to Nanny MS 541 for approval.

Once the MMSC 503 determines that the mobile station 543 is a mobile station of the minor and the MS 545 is preauthorized to send MMS messages to minor MS 543, the MMSC 503 will send an "M_notification.IND" message through the Network 501 to minor MS 543 at 3S5.1. The "M_notification.IND" message is delivered to Minor MS 543 via BS 513 and RAN 511 (shown in FIG. 5A). The "M_notification.IND" message serves as a "notification indicator" that the payload portion of the MMS message is available for retrieval. Furthermore, the "M_notification.IND" message wakes up the MMS client of the mobile station.

At 3S6.1, minor MS 543 sends a "HTTP_GET" message to MMSC 503 from which it received notice in step 3S5.1. The "HTTP_GET" message delivered to MMSC 503 via BS 513 and RAN 511 (shown in FIG. 5A). The "HTTP_GET" message requests delivery of the A2P MMS message from the MMSC 503. The "HTTP GET" message utilized the MM1 interface.

At 3S7.1, MMSC 503 sends a "M_retrieve.CONF" message to minor MS 543. The "M_retrieve.CONF" or "retrieve confirmation" message is delivered to minor MS 543 via BS 513 and RAN 511 (not shown). The "M_retrieve.CONF" message serves as a delivery message of the payload portion of the A2P MMS message and this provides the content supplied by MMS 545 to the MMSC 503 to the minor MS 543. The "M_retrieve.CONF" message utilizes the MM1 interface.

At 3S8.1, minor MS 543 sends a "M_notifyresp.IND" message to MMSC 503. The "M_notifyresp.IND" message is delivered to MMSC 503 via RAN 511 and BS 513 (shown in FIG. 5A). The "M_notifyresp.IND" or "Notification Response Indicator" serves as a delivery report of the earlier requested MMS message The "Notification Response Indicator" updates the MMSC 503 that it has successfully received the payload portion of the MMS message. Thus, the MMSC 503 is informed that the earlier MMS message was retrieved successfully by the MS 543. "The "M_notifyresp.IND" message utilizes the MM1 interface. After a message is retrieved by minor MS 543 from the MMSC, the MMSC generally deletes the message from the storage 571 (shown in FIG. 5B).

At 3S9.1, the MMSC(s) will send a verify and/or write the CDR. The CDR is retrieved and processed for the Network 501 to bill the mobile station (MS 545) for the MMS services rendered. This will occur once validation is complete and the message is sent successfully, regardless of whether or not the MMS message ever reaches the minor MS 543.

In some circumstances, it may be desirable for the adult associated with the mobile station of the minor to block delivery of a MMS message without needing to review or disapprove the MMS message each time the sender sends a MMS message to the mobile station of a minor. FIG. 4 is an exemplary signal flow diagram for MMS communication when the adult disapproves or blocks the MS 545 from sending MMS messages to the minor. At step 4S1.1, the adult sends a block request to Provisioning Server 552. In the current example the block request comes from the Nanny MS 541 but it should be noted that authorization may come from the adult by accessing the Network in other ways. For example, the adult may access the provider website and create a list of "blocked" mobile numbers or senders associated with the mobile station of the minor. If a MMS message is sent from a blocked mobile station, then the MMSC need not seek prior approval from the device associated with the adult before determining that the MMS message should not be sent to MS 543.

Once Nanny MS 541 has sent its block request to the Provisioning Server 552, the Provisioning Server 552 updates the Authentication Directory 510 with such information at 4S2.1. Provisioning Server updates the Authentication Directory 510 with the blocked sender information such that when LDAP determines a MMS message is sent to minor mobile station MS 543, the MMSC need not send the MMS message to Nanny MS 541 for approval.

When it is determined that MS 545 is blocked from sending MMS messages to the mobile station of a minor, the Nanny MS 541 does not receive the MMS message for approval or disapproval. At 4S3.1, an "M_send.REQ" message is sent from MS 545 to MMSC-1 503. The "M_send.REQ" message is received by MMSC-1 503 via BS 515 and RAN 511 (shown in FIG. 5A).

The "M_send.REQ" message requests sending of a MMS message-type from a request from the MS 545. The "M_send.REQ" MMS message will contain a multimedia content in addition to the sender's address. The "M_send.REQ" signaling message will also include the destination address(es) for the MMS message, so that the MMSC 503 processing the message knows to whom to deliver the MMS message. In this exemplary illustration, the sender's address is of the MDN format (e.g., MDN of the sending MS) and the destination address is of the MDN format (e.g., MDN of the intended destination MS). If the message originates at a server of a content provider, such as a VASP, the senders address may be in the short code format. Those skilled in the art will recognize that the general examples can readily be adapted to different applications, for example, if an email message was sent then the addressing scheme would conform to the RFC-822 standard for email messages; if a P2P message is sent, then the addressing scheme would be in a MDN format. The "M_send.REQ" message sent from MS 545 to MMSC-1 503 utilizes the MM1 interface.

At 4S3.2, MMSC 503 responds to MS 545's MMS request by sending a "M_send.CONF" message to MS 545. The "M_send.CONF" message is received by MS 545 via BS 515 (not shown) and RAN 511 (not shown). The "M_send.CONF" message is a confirmation message utilized to confirm receipt of the MMS service request message.

At 4S4.1, MMSC sends a query to Authentication Directory 510 using LDAP and receives a response therefrom at 4S4.2 in order to validate the message transfer. The MMSC 503 communicates with the Authentication Directory 510 to obtain relevant data from a subscriber record of the mobile stations. Validation verifies that the destination address of the MMS message is that of a valid subscriber; in other words if the Network 501 should send MMS messages of this sort to minor MS 543 identified by the MDN in the message. Furthermore, validation verifies that the source of the MMS service request is valid; in other words that the MS 545 is capable of sending the MMS message. Validation of the source requires that the entity sending the MMS message, in this case, MS 545, is registered with the MMSC 503 and is capable of sending MMS messages. If the MS 545 is not registered or is not capable of sending MMS messages in the MMSC 503, then the MMS message is not sent.

MMSC 503 also validates the destination mobile station to determine whether the mobile station is capable of receiving MMS messages. During this validation, the MMSC 503 also determines that the destination mobile station 543 is the mobile station of the minor. If the MMSC 503 obtains such information from the Authentication Directory 510, the blocked list will also be identified and reviewed to determine whether MS 545 is blocked from sending MMS messages to the minor MS 543. If it is determined that MS 545 blocked from sending MMS messages to the mobile station of the minor, MMSC will not need to send the MMS message to Nanny MS 541 for review.

Once the MMSC 503 determines that the mobile station 543 is a mobile station of the minor and the MS 545 is blocked from sending MMS messages to the minor MS 543, the MMSC 503 need not forward the message to either the Nanny MS 541 or minor MS 543. At 4S5.1, the MMSC(s) will send a verify and/or write the CDR. The CDR is retrieved and processed for the Network 501 to bill the mobile station (MS 545) for the MMS services rendered. This will occur once validation is complete and the message is sent successfully, regardless of whether or not the MMS message ever reaches the minor MS 543. Further, the confirmation may or may not contain information regarding whether the MMS message has be approved or disapproved. After determining the MMS message should not be forwarded through the network to the MS 543, the MMSC generally deletes the message from the storage 571.

It should be noted that the blocked and unblocked sender mobile stations may be part of the same authorization list. The rights associated with each sender account may be listed in the authorization list and varying rights may be given. For example, a mobile station may be authorized to send SMS messages but not MMS messages. Further, in the examples provided, the authorization list is associated with the mobile station of a minor. However, it is also contemplated that the authorization list may be associated with the mobile station of the sender. Such a list may be used to by law enforcement or the service provider to prevent the subscriber from sending MMS messages to an individual minor or to mobile stations associated with minors in general. For example, if the mobile subscriber is a known predator, the information may be utilized such that the subscriber account of the sender identifies the subscriber as a predator. When such an identified subscriber sends a MMS message to another mobile station, LDAP would be used to obtain such information from the Authentication Directory 510 when validating the subscriber's account. If the mobile station of the sender is identified as a minor and if the destination mobile station is the mobile associated with a minor, the MMS message may be blocked based on this information alone.

As shown by the above discussion, the functions relating to allow an adult associated with a mobile station of a minor to monitor and control the multimedia content delivered to the minor's mobile station are implemented on MMSCs and/or other computers or processor based systems of a mobile communication network. Although special built platforms could be used, the equipment typically will take the form of a server, computer or the like programmed to implement the functions discussed above.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. the information about the minor's mobile station and/or about the associated, and/or any lists of "pre-authorized" mobile numbers or previously blocked senders. The software code is executable by the general-purpose computer or the like that functions as the MMSC and or the LDAP system. In operation, the code is stored within the particular programmable platform. At other times, however, the software may be stored at other locations and/or transported for loading into the appropriate system hardware. Execution of such code by a processor of the platform enables the platform to implement the methodology for allowing an adult associated with a mobile station of a minor to monitor and control the multimedia content delivered to the minor's mobile station, in essentially the manner performed in the implementations discussed and illustrated herein.

Hence, aspects of the methods of adult control of message content addressed to a minor's mobile station, as outlined above, may be embodied in programming. Program aspects of the technology may be thought of as "products" or "articles of manufacture" typically in the form of executable code and/or associated data that is carried on or embodied in a type of machine readable medium. Broadly, terms such as computer or machine readable medium refer to any storage or communication medium that participates in providing instructions to a processor for execution, unless restricted to tangible or non-transitory type storage.

The concepts discussed above are amenable to a variety of changes and/or adaptations. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of screening and controlling delivery of multimedia messaging service (MMS) message content to a mobile station of a minor, comprising steps of:
    receiving a MMS message for delivery through a wireless mobile communication network;
    determining that the MMS message is addressed for delivery to the mobile station of the minor;
    sending a notification through the wireless mobile communication network to a terminal device of an adult associated with the mobile station of the minor that the MMS message is available for retrieval;
    receiving a delivery request from the terminal device of the adult through the wireless mobile communication network for the MMS message, responsive to the notification;
    sending the MMS message through the wireless mobile communication network to the terminal device of the adult associated with the mobile station of the minor, to make content of the MMS message available to the adult for review, responsive to the delivery request;
    after sending the MMS message to the terminal device of the adult, receiving a response through the wireless mobile communication network from the terminal device of the adult, the response including a status indication of whether to authorize delivery of the MMS message to the mobile station of the minor;
    determining from the status indication of the response whether or not the adult has authorized delivery of the MMS message to the mobile station of the minor; and
    sending the MMS message through the wireless mobile communication network to the mobile station of the minor, only upon determining that the adult has authorized delivery of the MMS message to the mobile station of the minor.

2. The method of claim 1, further comprising:
    receiving another MMS message for delivery through the wireless mobile communication network;
    determining that the other MMS message is addressed for delivery to the mobile station of the minor;
    sending the other MMS message through the wireless mobile communication network to the terminal device of the adult, to make content of the other MMS message available to the adult for review; and
    blocking delivery of the other MMS message through the wireless mobile communication network to the mobile station of the minor, in absence of a determination that the adult has authorized delivery of the other MMS message to the mobile station of the minor.

3. The method of claim 2, further comprising:
    identifying a communication device which is the source of the other MMS message addressed for delivery to the mobile station of the minor; and receiving notification, from the terminal device of the adult, that delivery of future MMS messages received from the other MMS message's source communication device and addressed to the mobile station of the minor should be blocked without making content of any further message available for adult review.

4. The method of claim 3, wherein information regarding blocked source communication devices is stored in a data set associated with the mobile station for the minor, the data set being accessible using a lightweight directory access protocol (LDAP).

5. The method of claim 3, further comprising:
receiving an additional MMS message for delivery through the mobile communication network;
determining that the additional MMS message is addressed for delivery to the mobile station of the minor;
identifying the sender of the additional MMS message as the sender of the other MMS message;
determining that the sender of the other MMS message is blocked from sending MMS messages to the minor; and
blocking delivery of the additional MMS message to the mobile station of the minor without making content of the additional MMS message available for adult review.

6. The method of claim 1, wherein the terminal device associated with the adult is another mobile station.

7. The method of claim 1, wherein the determination that the MMS message is addressed for delivery to a mobile station of a minor comprises:
identifying the mobile station to which the MMS message is addressed upon receiving the MMS message addressed for delivery; and
reviewing a data set associated with the identified mobile station to obtain information regarding the identified mobile station, the information including an indication the mobile station is associated with the minor.

8. The method of claim 7, wherein:
the data set is accessed using a lightweight directory access protocol (LDAP), and the data set includes information identifying the terminal device of the adult associated with the mobile station of the minor.

9. The method of claim 1, further comprising:
identifying a communication device that is the source of the MMS message addressed for delivery to the mobile station of the minor; and
receiving pre-authorization to send future MMS messages received from the source communication device and addressed for delivery to the mobile station of the minor to the mobile station of the minor without making the content of future MMS messages available to the adult for review, the preauthorization being received from the terminal device of the adult.

10. The method of claim 9, further comprising:
receiving another MMS message for delivery through the mobile communication network;
determining that the other MMS message is addressed for delivery to the mobile station of the minor;
identifying a communication device that is the source of the other MMS message as the source communication device of the MMS message;
determining from the pre-authorization that the source communication device of the MMS message is pre-authorized to send messages to the mobile station of the minor; and
sending the other MMS message through the wireless mobile communication network to the mobile station of the minor without making the content of the other MMS message available to the adult for review.

11. The method of claim 10, wherein information regarding the pre-authorization is stored in a data set associated with the mobile station of the minor, the data set being accessible using a lightweight directory access protocol (LDAP).

12. The method of claim 1, further comprising:
receiving an other MMS message for delivery through the wireless mobile communication network;
determining that the other MMS message is addressed for delivery to the mobile station of the minor;
identifying a communication device of the sender of the MMS message; and
reviewing an authorization list to determine whether the mobile station of the sender of the MMS message is preauthorized to send MMS messages to the minor or blocked from sending the MMS messages to the minor.

13. The method of claim 12, wherein:
the authorization list is associated with the mobile station of the minor, and
the authorization list has been created by the adult associated with the mobile station of the minor.

14. The method of claim 12, wherein:
the authorization list is associated with the communication device of the sender of the other MMS message; and
the authorization list has been created by law enforcement.

15. The method of claim 1, further comprising:
determining whether a source of the MMS message and a destination address of the MMS message are valid; and
storing a billing indication to bill the source of the MMS message when the MMS message is sent to the mobile station of the minor and the source and the destination address are valid, regardless of whether the MMS message reaches the mobile station of the minor.

16. The method of claim 1, further comprising:
determining that a source of the MMS message is a communication device of an other minor; and
blocking delivery of the MMS message to the mobile station of the minor when the source is a communication device of the other minor.

17. An article of manufacture comprising programming instructions stored on a non-transitory machine readable storage medium, the programming instructions executable by a computer of a multimedia messaging service center (MMSC) to configure the MMSC to perform functions including functions to:
receive a multimedia messaging service (MMS) message for delivery through a wireless mobile communication network;
determine that the MMS message is addressed for delivery to a mobile station of a minor;
send a notification through the wireless mobile communication network to a terminal device of an adult associated with the mobile station of the minor that the MMS message is available for retrieval;
receive a delivery request from the terminal device of the adult through the wireless mobile communication network for the MMS message, responsive to the notification;
send the MMS message through the wireless mobile communication network to the terminal device of the adult associated with the mobile station of the minor, to make content of the MMS message available to the adult for review, responsive to the delivery request;
after sending the MMS message to the terminal device of the adult, receive a response through the wireless mobile communication network from the terminal device of the adult, the response including a status indication of whether to authorize delivery of the MMS message to the mobile station of the minor;

determine from the status indication of the response whether or not the adult has authorized delivery of the MMS message to the mobile station of the minor; and send the MMS message through the wireless mobile communication network to the mobile station of the minor only upon determining that the adult has authorized delivery of the MMS message to the mobile station of the minor.

18. The article of manufacture of claim 17, wherein the functions include further functions to:

identify a communication device that is the source of the MMS message addressed for delivery to the mobile station of the minor; and receive a pre-authorization indication from the terminal device of the adult, such that the MMSC is configured, responsive to the pre-authorization indication, to send future MMS messages received from the source communication device and addressed for delivery to the mobile station of the minor to the mobile station of the minor without making the content of future MMS messages available to the adult for review.

19. A multimedia messaging service center (MMSC) comprising:

an interface for communication through a wireless mobile communication network with a mobile station of a minor and a terminal device of an adult associated with the mobile station of the minor; and a processor coupled to the interface and configured to:

receive a multimedia messaging service (MMS) message for deliver through the wireless mobile communication network, determine that the MMS message is addressed for delivery to the mobile station of the minor, send a notification through the wireless mobile communication network to the terminal device of the adult associated with the mobile station of the minor that the MMS message is available for retrieval, receive a delivery request from the terminal device of the adult through the wireless mobile communication network for the MMS message, responsive to the notification, send the MMS message through the wireless mobile communication network to the terminal device of the adult associated with the mobile station of the minor, to make content of the MMS message available to the adult for review, responsive to the delivery request, after sending the MMS message to the terminal device of the adult, receive a response through the wireless mobile communication network from the terminal device of the adult, the response including a status indication of whether to authorize delivery of the MMS message to the mobile station of the minor, determine from the status indication of the response whether or not the adult has authorized delivery of the MMS message to the mobile station of the minor, and send the MMS message through the wireless mobile communication network to the mobile station of the minor only upon determining that the adult has authorized delivery of the MMS message to the mobile station of the minor.

20. The MMSC of claim 19, wherein the processor is further configured to:

identify a communication device that is the source of the MMS message addressed for delivery to the mobile station of the minor; and receive a pre-authorization indication from the terminal device of the adult, such that the MMSC is configured, responsive to the pre-authorization indication, to send future MMS messages received from the source communication device and addressed for delivery to the mobile station of the minor to the mobile station of the minor without making the content of future MMS messages available to the adult for review.

\* \* \* \* \*